Oct. 20, 1959     W. J. TOEPFER ET AL     2,909,004
PLUNGER REMOVAL CHUCK FOR INSULATOR PRESS
Filed Aug. 16, 1955
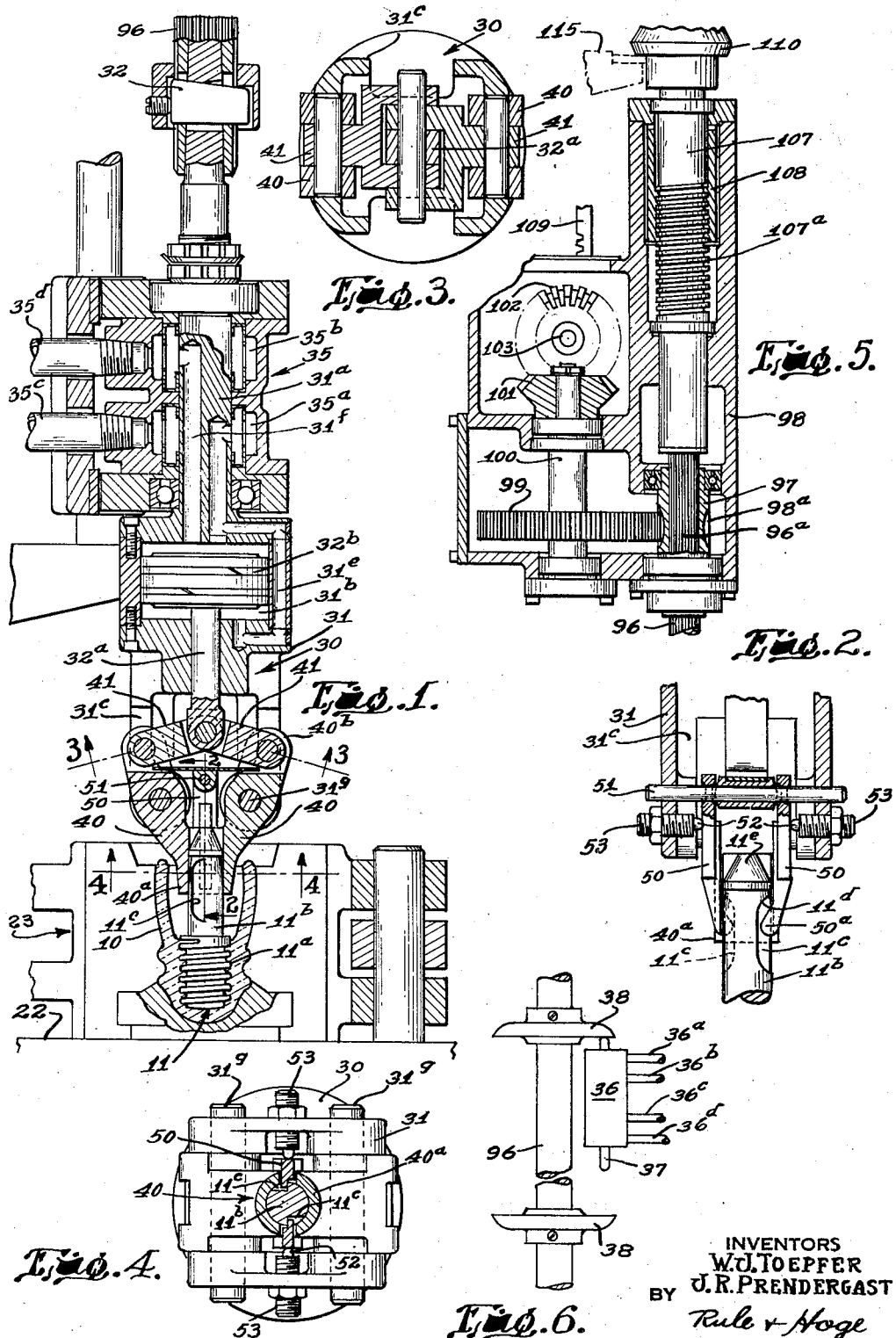
INVENTORS
W.J. TOEPFER
BY J.R. PRENDERGAST
Rule + Hoge
ATTORNEYS United States Patent Office 2,909,004
Patented Oct. 20, 1959

2,909,004

PLUNGER REMOVAL CHUCK FOR INSULATOR PRESS

Walter J. Toepfer and John R. Prendergast, Toledo, Ohio, assignors to Owens-Illinois Glass Company, a corporation of Ohio Application August 16, 1955, Serial No. 528,716

3 Claims. (Cl. 49—43)

This invention relates to a machine for press molding hollow glass articles, such as glass insulators, and more particularly, relates to an improved chuck for removing the screw-threaded plunger which is commonly employed in the pressing of such articles to produce internal threads in the article.

The invention of this application constitutes an improvement to the machine disclosed in the joint copending application of W. J. Toepfer and W. A. Stutske, Serial No. 460,526, filed October 6, 1954, now issued as Patent No. 2,863,260, and assigned to the assignee of this application. In such copending application, there is described a complete machine particularly adapted for press molding glass insulators and forming screw threads on their interior surfaces. Such machine utilizes a separate externally-threaded plunger for each glass insulator formed, which plunger is introduced into a charge of glass within the insulator mold by a pressing plunger. In this manner, the interior surface of the glass is molded to conform to the exteriorly threaded shape of the inserted plunger. The pressed insulator, with the inserted plunger still in position, is then transferred to a plunger removal station. At such station, a chuck carrier is mounted in coaxial relationship with respect to the positioned insulator, and mechanism is provided, as described in said copending application, for helically moving the chuck carrier along a path corresponding to the pitch of the threads on the threaded plunger.

The chuck provided on the machine described in said copending application was a mechanically actuated type which was found in practice to be subject to several disadvantages, principally in the amount of gripping force which the chuck exerted upon a plunger and the problem of misregistration of the tong-like gripping arms of the chuck with the axially extending slots commonly provided in the free end of the threaded plunger by which the required torsional force is applied to the plunger to unscrew it from the glass insulator.

Accordingly, it is an object of this invention to provide an improved plunger removing chuck for a glass insulator press. More particularly, it is an object of this invention to provide a plunger removing chuck wherein the plunger gripping tongs of the chuck are hydraulically actuated through a toggle linkage to effect a positive engagement with the threaded plunger.

Still another object of this invention is to provide an improved plunger engaging chuck for a glass insulator press wherein a pair of spring-actuated secondary tongs are engageable with the threaded plunger to effect a torsional locking relationship with such plunger while at the same time, a primary clamping force is exerted upon the plunger by a pair of hydraulically-actuated primary tongs.

Other objects and advantages of this invention will become apparent to those skilled in the art from the following detailed description, taken in conjunction with the annexed sheet of drawings, on which, by way of preferred example only, is illustrated one embodiment of this invention.

On the drawings:

Figure 1 is a vertical sectional view of a plunger removing apparatus embodying this invention, shown at the plunger removing station of the machine more particularly described in the above-identified copending application of W. J. Toepfer and W. A. Stutske.

Figure 2 is an enlarged scale vertical sectional view taken along the plane 2—2 of Figure 1.

Figure 3 is a sectional view taken along the plane 3—3 of Figure 1.

Figure 4 is a sectional view taken along the plane 4—4 of Figure 1.

Figure 5 is a reduced scale vertical sectional view of the additional mechanism provided above the apparatus of Figure 1 for effecting the driving of such apparatus.

Figure 6 is a schematic view of an arrangement for actuating the control valve for the plunger removing chuck.

As shown on the drawings:

Numeral 23 indicates a pivotally openable mold, which is one of a plurality of such molds arranged in annular relationship on a mold carriage 22, as is more particularly described in said copending application. Alternatively, other mold indexing mechanisms known in the prior art may be used to successively index the insulator through successive work stations such as, for example, is described in United States Patent No. 1,642,658 issued September 13, 1927 to M. K. Holmes. Mold 23 is shown in its position at the plunger removing station of the machine described in such copending application. At such station, the mold 23 carries a completely formed insulator 10 with a molding implement such as a threaded plunger 11 inserted therein. Plunger 11 has an externally threaded portion 11a embedded in the glass of the insulator 10 to define cooperating threads in the mounting hole of such insulator. The shank or stem portion 11b of the plunger 11 projects upwardly and is provided with a pair of opposed axially extending slots 11c having rounded end surfaces 11d for a purpose to be hereafter described.

A plunger chuck carrier shaft 96 is provided on the machine in overlying relationship to the plunger removal station, as is described in said copending application. At its lower extremity, the shaft 96 mounts a chuck unit 30 embodying this invention, and such chuck unit operates a pair of primary grasping tongs 40 to grasp the threaded plunger 11 and effect its removal from the formed insulator 10 by the application of a helical withdrawing motion thereto.

The chuck carrier shaft 96 is mounted for combined rotative and vertical movements, as is more particularly described in said copending application, said shaft having a splined portion 96a cooperating with an internally splined sleeve 97 journaled in a frame 98. The sleeve is formed with external gear teeth 98a meshing with a gear 99 keyed to a vertical shaft 100 journaled in the frame 98. Oscillating motion is imparted to vertical shaft 100 through bevel gears 101 and 102 and a shaft 103, which is oscillated by a rack 109, in turn operated by a piston motor, not here shown but described in said copending application. An internally splined sleeve 107 having external threads 107a is mounted on a splined portion of shaft 96 and cooperates with a stationary nut 108 to convert any rotary motion of shaft 96 into a helical movement having the same pitch as the threads 11a of the plunger 11. Additionally, the extreme top portion of chuck carrier shaft 96 is provided with a collar 110, which is engaged by an air operated arm 115 to vertically shift the entire shaft 96.

The mechanism thus far described is substantially identical to that described in said copending application. This invention particularly relates to the construction of the plunger engaging chuck 30. As best shown in Figure 1, the chuck 30 comprises a hollow housing 31, hereinafter referred to as a chuck carrier, having an upper stem portion 31a which is connected to carrier shaft 96 by key 32 and a lower hollow portion which defines a chamber 31c for mounting the tongs 40 and their actuating mechanisms. The central portion of chuck carrier housing 31 defines a hydraulic cylinder chamber 31b, and a piston 32b is mounted in such chamber and is rigidly connected to a piston rod 32a which projects axially downwardly into the tong chamber 31c. Suitable fluid passages 31e and 31f are formed in the chuck housing 31 to permit the application of pressured hydraulic fluid or air to either side of the piston 32. Passages 31e and 31f respectively extend upwardly through the stem portion 31a and communicate with annular chambers 35a and 35b respectively defined in a stationary housing 35. Pipes 35c and 35d are respectively provided to connect the chambers 35a and 35b alternately to a source of pressured fluid or to the sump of the pressure fluid system, in order to achieve a desired vertical displacement of the piston 32.

At the lower extremity of the chuck housing 31, a pair of pivot pins 31g are transversely mounted, and such pins provide a medial pivotal mounting for a pair of primary tongs 40. The lower ends 40a of the tongs 40 form jaws which are arcuately shaped to snugly engage the periphery of the stem portion 11b of the threaded plunger 11. The upper ends 40b of the primary tongs are respectively pivotally connected with the piston rod 32a by a pair of connecting links 41, which are disposed in toggle relationship relative to the end of the piston rod 32a and the pivoted primary tongs 40. It is therefore apparent that as the piston 32 is displaced downwardly relative to its cylinder chamber 31b, the plunger engaging ends of the tongs 40 will be shifted toward each other so as to impart a firm grasping force on the plunger stem portion 11b. Conversely, an upward motion of the piston 32 will produce an outward displacement of the tong ends 40a and hence cause the release of the plunger stem 11b.

Despite the fact that considerable pressure may be applied to the plunger stem 11b by the hydraulically actuated tongs 40, nevertheless, a positive torsionally locked engagement between the chuck 30 and the plunger 11 is necessary to insure the unseating of the plunger 11 from the glass insulator 10. Heretofore, it has been customary to provide projections on the ends of tongs 40 to engage in the axially extending slots 11c provided in the plunger stems and thus effect a locked torsional relationship therewith. However, the angular position of such slots relative to the tongs is purely a matter of chance and, as a result, the locking projections on the tong ends would be forced to slide around the surface of the plunger stem 11b until alignment with the slots 11c was effected. Such relative motion, under the relatively great clamping pressures exerted, caused undue wear and breakage of both the tong ends and the plunger stems.

In accordance with another feature of this invention, a pair of spring pressed secondary tongs or indexing levers 50 is provided which are loosely pivotally mounted in the tong chamber 31c on a transverse pin 51. The secondary tongs respectively lie intermediate the primary tongs 40, and their depending ends are formed with rounded projections 50a to permit them to ride axially into and out of slots 11c provided in the plunger stem 11b. The secondary tongs 50 are respectively urged to a slot engaging position by a pair of spring pressed plungers 52 which are in turn mounted within an externally threaded cylindrical housing 53 which traverses the walls of tong chamber 31c. Since the engagement of the chuck 30 with the plunger 11 is effected by an axial movement, it is clear that the secondary tongs 50 will freely slip over the tapered end 11e of the plunger stem 11b and engage the plunger stem 11b with a light spring pressure. Accordingly, the initial rotation of the chuck 30 relative to the plunger stem 11b will effect the alignment of the secondary tongs 50 with the axial slots 11c, and the secondary tongs 50 may rotate relative to the plunger stem 11b to locate and to snap into such slots under the influence of their spring bias. Since the secondary tongs 50 are loosely pivotally mounted on mounting pin 51, there is sufficient slack to permit the grasping ends 40a of primary tongs 40 to respectively move into abutment with the adjacent secondary tongs 50 and hence, a locked torsional engagement between the primary tongs 40 and the plunger stem 11 is effectively achieved.

Figure 6 shows schematically a suitable valve arrangement for controlling the timed application of fluid pressure to the desired side of piston 32. A control valve 36 is provided, of conventional construction, having fluid connections 36a, 36b, 36c and 36d, which are respectively connected to the pressure side of a hydraulic pressure source, the sump side of such source, and the pipes 35c and 35d. Valve 36 has an actuating plunger 37, opposite ends of which are disposed in the path of movement of two annular projections 38, which are respectively either mounted in spaced positions on carrier shaft 96 or are mounted for synchronous axial movements with such shaft. The valve operating projections 38 are respectively mounted so as to cause the actuation of valve 36 in reverse directions respectively when shaft 96 reaches its lowermost and uppermost extreme positions of vertical movement.

The operation of the improved plunger removal chuck embodying this invention will be apparent from the foregoing description and by reference to the description of the complete machine contained in said copending application. When the mold 23 is positioned at the plunger removal station, the chuck carrier shaft 96 is lowered until the tongs of the chuck are in surrounding relationship to the plunger stem 11. Throughout this lowering movement, the piston 32 is held in its upper position so as to maintain the primary tongs 40 in their open position. When the carrier shaft 96 reaches its bottom position, the valve 36 (Figure 6) is energized to cause the application of pressured fluid to the upper side of piston 32 and the connection of the lower side of piston 32 to the sump of the hydraulic pressure system. The resulting downward movement of the piston 32 effects a clamping engagement of the primary tongs 40 with the plunger stem 11b. The ram (not shown) actuating the shaft 103 is then energized, and a rotational movement is imparted to the shaft 96. The externally screw threaded sleeve 107 working in the internally threaded sleeve 108 imparts a helical movement to the shaft 96, which is identical in pitch to the threads 11a of the inserted plunger 11. The plunger 11 is thus unscrewed from its engagement with the glass insulator 10, and when this is accomplished, the shaft 96 is rapidly raised to its extreme top position by the air operated arm 115. When the shaft 96 reaches such top position, the control valve 36 is actuated to return to its original position wherein fluid pressure is supplied to the bottom side of piston 32, and the primary tongs 40 are thereupon released, and the plunger stem 11 will drop from its spring pressed engagement with secondary tongs 50 under the influence of gravity.

It will, of course, be understood that various details of construction may be modified through a wide range without departing from the principles of this invention, and it is, therefore, not the purpose to limit the patent granted hereon otherwise than necessitated by the scope of the appended claims.

We claim:

1. In an apparatus for extracting a threaded plunger from a glass article press-molded thereon, said plunger having an axial shank provided with a plurality of slots, said apparatus including a rotatable chuck axially displaceable towards and away from said plunger, said chuck being helically displaceable in a plunger-extracting direction, the improvements of separate interdigitated primary and secondary tongs carried by and displaceable with said chuck, power-actuated toggle means urging said primary tongs into engagement with substantial peripheral portions of said shank, pivot means freely interconnecting said secondary tongs and said chuck accommodating free radial movement of said secondary tongs into engagement with said shank, and spring means urging said secondary tongs into said shank slots to establish corotation between said chuck and said primary tongs.

2. In an apparatus for extracting a threaded plunger from a glass article press-molded thereon, said plunger having a vertically extending axial shank provided with a plurality of slots, said apparatus including a rotatable chuck axially displaceable towards and away from said plunger, said chuck being helically displaceable vertically upwardly in a plunger-extracting direction, the improvements of separate interdigitated primary and secondary tongs carried by and displaceable vertically with said chuck, said primary tongs having arcuate lower extremities for grasping engagement with the periphery of said shank and said secondary tongs having lower extremities radially enterable into the shank slots, power-actuated toggle means urging said primary tongs into engagement with substantial peripheral portions of said shank, pivot means interconnecting said secondary tongs and said chuck, and means for biasing said secondary tongs radially into said shank slots to establish corotation between said chuck and said primary tongs.

3. In an apparatus for extracting a threaded plunger from a glass article press-molded thereon, said plunger having an axial shank provided with a plurality of slots, said apparatus including a rotatable chuck axially displaceable towards and away from said plunger, said chuck being helically displaceable in a plunger-extracting direction, the improvements of separate interdigitated primary and secondary tongs carried by and displaceable with said chuck, toggle means interconnecting said primary tongs and said chuck for corotation and concurrent helical displacement, a fluid pressure cylinder operatively connected to said toggle means for urging said primary tongs into engagement with substantial peripheral portions of said shank, pivot means freely interconnecting said secondary tongs and said chuck accommodating free radial movement of said secondary tongs intermediate said primary tongs into engagement with said shank, and spring means urging said secondary tongs into said shank slots, said secondary tongs projecting radially into engagement with said primary tongs to establish corotation between said chuck and said primary tongs.

References Cited in the file of this patent

UNITED STATES PATENTS

| | | |
|---|---|---|
| 735,429 | Waters | Aug. 4, 1903 |
| 1,550,455 | Randall | Aug. 18, 1925 |
| 1,642,658 | Holmes | Sept. 13, 1927 |